UNITED STATES PATENT OFFICE.

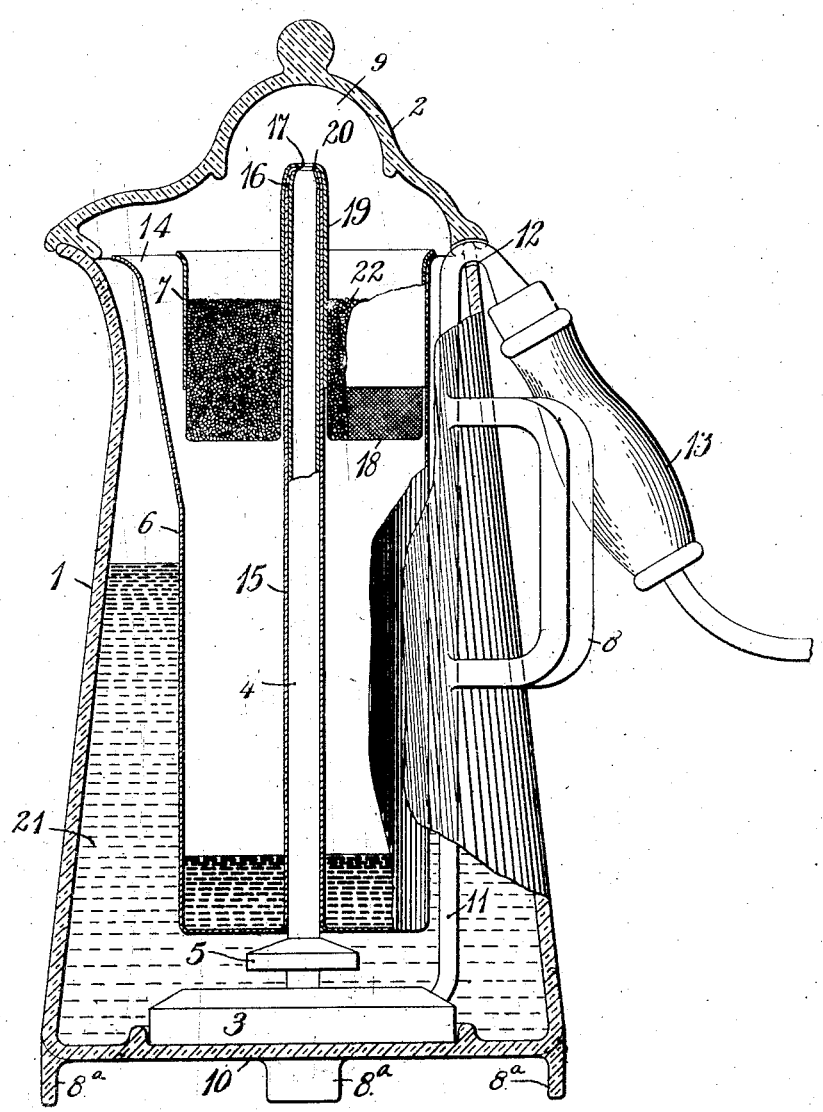

THEODORE ABTMEYER, OF WILKINSBURG, PENNSYLVANIA, ASSIGNOR TO WESTINGHOUSE ELECTRIC AND MANUFACTURING COMPANY, A CORPORATION OF PENNSYLVANIA.

PERCOLATING DEVICE.

1,158,421.  Specification of Letters Patent.  Patented Nov. 2, 1915.

Application filed December 21, 1910. Serial No. 598,521.

*To all whom it may concern:*

Be it known that I, THEODORE ABTMEYER, a citizen of the United States, and a resident of Wilkinsburg, in the county of Allegheny and State of Pennsylvania, have invented a new and useful Improvement in Percolating Devices, of which the following is a specification.

My invention relates to electrically heated liquid-containing vessels and it has special reference to coffee percolating devices and similar apparatus.

The object of my invention is to provide a particularly sanitary device of the above-indicated character which shall be extremely simple and inexpensive in construction and may be utilized in the usual manner of percolating machines to produce a large quantity of coffee, or the like, or may be readily adapted to produce small quantities thereof in a comparatively short interval of time. Moreover, all of the component parts thereof, except the electric heater, are preferably made of glass and are readily removable for the purpose of cleaning. It is evident, therefore, that the entire percolating process is visible and may be governed according to its progress and conditions.

In the prior art, it has been customary practice to construct percolating apparatus in which the percolating action was continuous; that is, the liquid passed through the same cycle of operation until the whole body was sufficiently saturated. This process involved a considerable length of time and expense, which was prohibitive if only a small amount of coffee was desired.

According to my invention, I provide a removable inner receptacle that may be easily placed in position to receive the liquid which percolates through the coffee grounds, or the like. Thus, the coffee is collected after having passed but once through the grounds and it is evident that a small quantity of coffee may be made in a very short time and at a relatively small expense. Furthermore, inasmuch as the inner receptacle is readily removable, it is a matter of ease to adapt my percolator to the usual mode of operation, whereby large quantities of coffee may be made. A very useful, adaptable, and sanitary device is therefore provided which is not only inexpensive in construction but is economical to operate and maintain.

The single figure of the accompanying drawing is a view, partially in section, and partially in elevation, of a device constructed in accordance with my invention.

Referring to the drawing in detail, the device herein shown comprises a liquid-containing vessel 1, a cover 2, an incased electric heater 3, a fountain tube 4, a percolator pump 5, an inner receptacle 6, and a percolator cup 7.

The liquid-containing vessel 1 is preferably a glass pitcher having a handle 8 and a plurality of legs 8$^a$, but any other suitable receptacle may, of course, be employed. The cover 2, which is also preferably constructed of glass, embodies a dome or chamber 9 and fits tightly on to the upper portion of the pitcher 1.

The electric heater 3 rests upon the bottom 10 of the pitcher 1 and is provided with a protecting tube 11 which projects through an opening 12 in the upper edge of the pitcher 1 and terminates in a suitable handle 13, within which the necessary circuit connections are made. Although the heater 3 forms no part of my invention, except as it performs a necessary function in the operation of the device herein shown, I prefer that its construction conform to that shown and described in detail in a copending application, Serial No. 595,619, filed December 5, 1910, by E. E. Rose and assigned to the Westinghouse Electric & Manufacturing Company. Any other electric heater may, of course, be employed.

The fountain tube 4, which is centrally disposed upon the heater unit 3, and may be rigidly attached thereto, projects upwardly into the dome or chamber 9 and is provided, near its lower end, with the percolator pump 5, which may be of any of the ordinary forms of construction.

The inner receptacle 6 is preferably constructed of glass and embodies a nose 14 and a centrally located integral tubular member 15, through which the fountain tube 4 projects. The upper portion 16 of the tubular member 15 is provided with a contracted opening, the edge 17 of which rests upon the top of the fountain tube 4 and holds the receptacle 6 in position. The percolator cup 7 may also be of glass and is provided with a sieve or screen 18 at its bottom and sides, and with an integral tubular member 19 which similarly fits over the fountain tube 4 and the tubular member 15. The tubular member 19 is provided with a contracted upper edge 20 by means of which the retaining cup 7 is suitably suspended in position.

Assuming the various parts of the device to be in the position shown, the operation thereof is as follows: When electric energy is supplied to the heater 3, a portion of the liquid 21 contained within the pitcher 1 is intermittently projected upwardly through the fountain tube 4 in the usual manner. As the liquid is thus forced up through the tube 4, it is caught in the cup 7 and percolates through the coffee grounds 22 contained therein, after which it is collected in the inner receptacle 6 until the desired quantity is obtained. Thus, it is evident that a small amount of coffee may be made in a comparatively short time and at a reasonable expense, inasmuch as it is unnecessary to make any more than is actually desired. After the process has continued a sufficient time to produce the amount of coffee desired, the operation is discontinued and the heater unit, inner receptacle and other associated parts are removed bodily from the pitcher 1 by means of the handle 13, whence the coffee may be dispensed through the nose 14.

In case a large amount of coffee is desired, the inner receptacle may be readily removed and the remaining parts replaced within the pitcher 1, after which the process may be continued in the usual manner.

Various modifications may be made in the structural details and in the arrangement and location of parts without departing from the spirit and scope of my invention, and I desire that only such limitations shall be imposed as are indicated in the appended claims.

I claim as my invention:

1. In a percolator, an immersion electric heater, a percolator pump associated with said heater, a fountain tube, a separable elongated receptacle surrounding said fountain tube, and a percolator cup disposed within the upper end of said elongated receptacle, in combination with a liquid-containing receptacle in which said members are located and from which they are removable as a unit.

2. In a percolator, an immersion electric heater, a fountain tube projecting upwardly from said heater, a separable elongated receptacle mounted on said fountain tube and a percolator cup also mounted on said tube within the upper end of said receptacle, in combination with a liquid-containing vessel in which said parts are located and removable as a unit.

3. In a percolator, a percolator pump, an immersion heater associated therewith, a fountain tube, a separable receptacle surrounding and supported upon said tube, and a percolator cup mounted upon the top of said tube within said receptacle, in combination with a liquid-containing vessel in which said parts are located and removable as a unit.

4. In a percolator, the combination with a liquid-containing vessel, of a fountain tube, a percolator pump and an electric heater rigidly connected and centrally disposed within said vessel, a removable receptacle surrounding said fountain tube and supported thereon, and a separable percolator cup disposed within the upper end of said receptacle and also supported on said tube.

5. In a percolator, the combination with a liquid-containing vessel, of a receptacle having a centrally disposed integral tubular portion, a percolator cup disposed within the upper end of said receptacle, a fountain tube projecting upwardly through said receptacle and said cup, means for supporting said receptacle and cup on said tube, a percolator pump and a heater rigidly associated with said fountain tube, and a handle located outside said liquid-containing vessel and rigidly connected to said heater.

6. In a percolator, the combination with a liquid reservoir, a fountain tube, a percolator pump for forcing liquid upwardly through said fountain tube, a heater associated with said pump, a receptacle surrounding said tube, and a percolator cup within the upper end of said receptacle, and means for supporting said receptacle and cup upon said fountain tube.

7. In a percolator, the combination with a liquid-containing vessel, of a centrally disposed fountain tube, a percolator pump and a base resting upon the bottom of said vessel associated rigidly with said tube, a handle located outside said vessel and connected to said base, a separable liquid-receiving receptacle surrounding said fountain tube and supported thereon, and a removable percolator cup also supported upon said tube and located within the upper end of the receptacle.

8. In a percolator, the combination with a liquid-containing vessel, a cover therefor, an incased electric heater inclosed in said vessel, a percolator pump associated with said heater, and a centrally disposed fountain tube associated with said pump and projecting upwardly to near the top of said containing vessel, of an inner receptacle having a centrally located integral tubular member through which said fountain tube projects, said tubular member having an inturned open end to support said inner receptacle, and a percolator cup disposed within the top of said inner receptacle and having a similar integral tubular member which is adapted to fit over said fountain tube and said first named tubular member.

In testimony whereof, I have hereunto subscribed my name this 9th day of Dec. 1910.

THEODORE ABTMEYER.

Witnesses:
B. B. HINES,
J. R. BACKOFEN.